(12) United States Patent
Chu et al.

(10) Patent No.: US 8,661,909 B2
(45) Date of Patent: Mar. 4, 2014

(54) METHOD, APPARATUS AND SYSTEM FOR MAPPING PIPELINE

(75) Inventors: Hao-Hua Chu, Taipei (TW); Tsung-Te Lai, Taipei (TW); Yu-Han Chen, Taipei (TW); Polly Huang, Taipei (TW)

(73) Assignee: National Taiwan University, Taipei (TW)

( * ) Notice: Subject to any disclaimer, the term of this patent is extended or adjusted under 35 U.S.C. 154(b) by 345 days.

(21) Appl. No.: 13/219,776

(22) Filed: Aug. 29, 2011

(65) Prior Publication Data
US 2012/0152025 A1    Jun. 21, 2012

(30) Foreign Application Priority Data

Dec. 15, 2010  (TW) .............................. 99143944 A

(51) Int. Cl.
*G01L 7/00*    (2006.01)
(52) U.S. Cl.
USPC .................................. 73/714; 73/700; 73/861
(58) Field of Classification Search
None
See application file for complete search history.

(56) References Cited

U.S. PATENT DOCUMENTS

| | | | |
|---|---|---|---|
| 5,892,159 A * | 4/1999 | Smith | 73/861.354 |
| 6,243,657 B1 | 6/2001 | Tuck et al. | |
| 7,100,463 B2 | 9/2006 | Boudreaux | |
| 8,209,055 B2 * | 6/2012 | Shu | 700/258 |
| 2002/0113869 A1 | 8/2002 | Kirkwood | |

FOREIGN PATENT DOCUMENTS

| | | |
|---|---|---|
| TW | 528854 | 4/2003 |
| TW | 559265 | 10/2003 |
| TW | 585958 | 5/2004 |

OTHER PUBLICATIONS

Tsung-Te Lai et al, "PipeProbe: A Mobile Sensor Droplet for Mapping Hidden Pipeline", ACM Conference on Embedded Networked Sensor Systems, Zurich, Switzerland, Nov. 2010.

* cited by examiner

*Primary Examiner* — Lisa Caputo
*Assistant Examiner* — Jermaine Jenkins
(74) *Attorney, Agent, or Firm* — Bacon & Thomas, PLLC

(57) ABSTRACT

The present invention provides an apparatus for mapping pipeline for use in a fluid pipeline, comprising: a pressure gauge that measures the pressure of the fluid in the fluid pipeline; a gyroscope that measures the angular velocity of the apparatus for mapping pipeline in the fluid pipeline; a processing module that collects and converts the pressure of the fluid and the angular velocity to a pressure data and an angular velocity data, respectively; and a data output module that outputs the pressure data and the angular velocity data. The present invention also provides a method for mapping pipeline and a system using the same that obtain the spatial layout of the fluid pipeline by analyzing the pressure data and the angular velocity data.

22 Claims, 7 Drawing Sheets

METHOD, APPARATUS AND SYSTEM FOR MAPPING PIPELINE

CROSS REFERENCE TO RELATED APPLICATIONS

This application claims the benefit of Taiwan patent application No. 099143944, filed on Dec. 15, 2010, with the Taiwan Intellectual Property Office (TIPO), of which is incorporated for reference in its entirety.

BACKGROUND OF THE INVENTION

1. Field of the Invention

The present invention relates to an apparatus, a system and a method for mapping, and more particularly, to an apparatus, a system and a method for mapping a fluid pipeline.

2. Description of the Prior Art

Generally, a large number of water pipes are arranged in a house to supply water to different areas, such as toilets, washing machines, faucets, etc. Therefore, the layout of water pipes concealed by panels is quite complex. When water leaks from a crack formed on the water pipeline, the leakage spot needs to be detected prior to the repair. When the pipeline with leakage problem is concealed by walls or floor panels, the detection of the leakage spot will be even more difficult. Traditionally, people speculate about the location of the leakage spot and then cut through the panel to find out the leakage spot. The use of the aforementioned method can cause great damages to the structure and decoration of the house, incurring more costs. If the leakage spot is not located beneath the panel, which is being cut through, the searching for the leakage spot has to be resumed and the walls or floor panels have to undergo the destructive process again, delaying the scheduled plan.

When an old building is to be renovated and redecorated, it is very important to know the layout of the water pipeline. However, the original layout of the water pipeline is usually unavailable, thus the dismounting of panels is required to reconstruct the layout of the water pipeline, resulting in an increment in labor and cost.

Therefore, a need exists in the art for an apparatus, a system and a method for mapping pipeline that analyze the pressure data and the angular velocity data to obtain the spatial layout of the fluid pipeline so as to solve the aforementioned problem.

SUMMARY OF THE INVENTION

The present invention provides an apparatus for mapping pipeline comprising: a hollow housing having a through hole; a pressure gauge disposed in the through hole to seal the interior of the hollow housing and configured to measure the external pressure of the hollow housing; a circuit board disposed inside the hollow housing and electrically connected to the pressure gauge; a gyroscope disposed inside the hollow housing and configured to measure the angular velocity of the apparatus for mapping pipeline, the gyroscope being electrically connected to the circuit board; and a weight disposed inside the hollow housing and located under the circuit board.

The present invention provides a system for mapping pipeline for use in a fluid pipeline, comprising: an apparatus for mapping pipeline comprising a pressure gauge that measures the pressure of the fluid in the fluid pipeline; a gyroscope that measures the angular velocity of the apparatus for mapping pipeline in the fluid pipeline; a processing module that collects and converts the pressure of the fluid and the angular velocity to a pressure data and an angular velocity data and a data output module that outputs the pressure data and the angular velocity data; wherein the data output module outputs the pressure data and the angular velocity data to a computer system, and the computer system analyzes the pressure data and the angular velocity data to obtain the spatial layout of the fluid pipeline.

The present invention provides a method for mapping pipeline for use in a fluid pipeline, comprising: placing an apparatus for mapping pipeline in the fluid pipeline to collect the pressure of the fluid in the fluid pipeline and the angular velocity of the apparatus for mapping pipeline during a period of time when the apparatus for mapping pipeline moves in the fluid pipeline; receiving the pressure of the fluid and the angular velocity collected by the apparatus for mapping pipeline; and analyzing the pressure of the fluid and the angular velocity to obtain the spatial layout of the fluid pipeline.

DETAILED DESCRIPTION OF THE PREFERRED EMBODIMENTS

Figure 1:
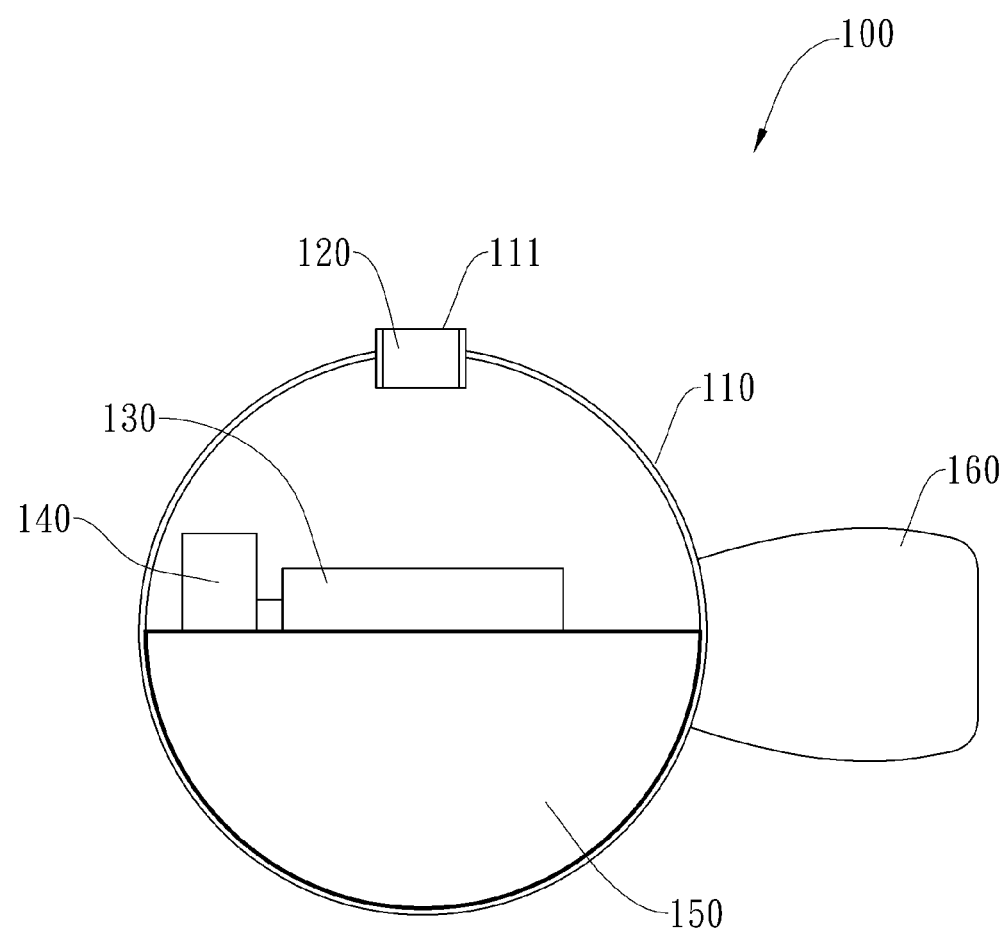
FIG. 1 is a schematic view showing the structure of an apparatus for mapping pipeline of the present invention.

FIG. 1 is a schematic view showing the structure of an apparatus for mapping pipeline of the present invention. The present invention provides an apparatus 100 for mapping pipeline for use in a fluid pipeline to obtain the spatial layout of the fluid pipeline. The apparatus 100 for mapping pipeline comprises a hollow housing 110, a pressure gauge 120, a circuit board 130, a gyroscope 140, a weight 150 and a rear fin 160.

In the embodiment shown in FIG. 1, the hollow housing 110 has a through hole 111 and may be made of plastic material. If the apparatus 100 for mapping pipeline is to be used in a water pipeline, the hollow housing 110 must be made of waterproof material to protect the internal components, such as the circuit board 130 and the gyroscope 140. The shape and size of the hollow housing 110 can be adjusted according to the type of pipeline in which it is to be used. Generally, the apparatus 100 for mapping pipeline of a smaller size can move more freely in the pipeline.

The weight 150 is disposed inside the hollow housing 110 and located under the circuit board 130. The weight 150 is configured such that the apparatus 100 for mapping pipeline has a density close to that of the fluid in the fluid pipeline. Accordingly, the apparatus 100 for mapping pipeline will not float on the surface of the fluid due to its light weight and thus can be prevented from having an unstable moving speed resulting from the floatation. For example, if the fluid is water, the apparatus 100 for mapping pipeline should have a density close to 1 g/cm$^3$. Moreover, the weight 150 has a greater density, thus the apparatus 100 for mapping pipeline, which is like a roly-poly toy, has a centre of gravity located at the lower portion thereof. Such an arrangement can reduce the frequency of reversal of the apparatus 100 for mapping pipeline. In addition, the weight 150 can be disposed at the bottom of the hollow housing 110 to further lower the centre of gravity of the apparatus 100 for mapping pipeline. As the frequency of reversal of the apparatus 100 for mapping pipeline reduces, the reading on the pressure gauge 120 is more stable.

In one embodiment of the present invention, the hollow housing 110 is sphere-shaped and the weight 150 is hemisphere-shaped. As the spherical hollow housing 110 has a symmetrical structure, the moving speed of the apparatus 100 for mapping pipeline will remain unchanged when the apparatus 100 for mapping pipeline is reversed in the fluid of the fluid pipeline.

The pressure gauge 120 is disposed in the through hole 111 to seal the interior of the hollow housing 110 and configured to measure the external pressure of the hollow housing 110. The pressure gauge 120 can be sized to fit the through hole 111 to seal the hollow housing 110. Alternatively, the pressure gauge 120 can be sized to be smaller than the through hole 111, and the gap between the pressure gauge 120 and the through hole 111 is filled by the sealing material. Preferably, the pressure gauge 120 is disposed on the topmost of the apparatus 100 for mapping pipeline.

The circuit board 130 is disposed inside the hollow housing 110 and electrically connected to the pressure gauge 120. The gyroscope 140 is disposed inside the hollow housing 110 and configured to measure the angular velocity of the apparatus 100 for mapping pipeline. Moreover, the gyroscope 140 is electrically connected to the circuit board 130. In general, the gyroscope 140 needs to be placed horizontally to obtain accurate angular velocity.

The rear fin 160 is disposed on the external surface of the hollow housing 110 to perform self-correction operation so that the apparatus 100 for mapping pipeline can return to the original orientation when the unevenly applied force caused by turbulence in the fluid pipeline makes it rotate. The rear fin 160 may be a flat plate, and the surface of the flat plate is parallel to the section plane extending from the topmost to the bottommost of the apparatus 100 for mapping pipeline so that the apparatus 100 for mapping pipeline can move stably in the horizontal direction.

Figure 2:
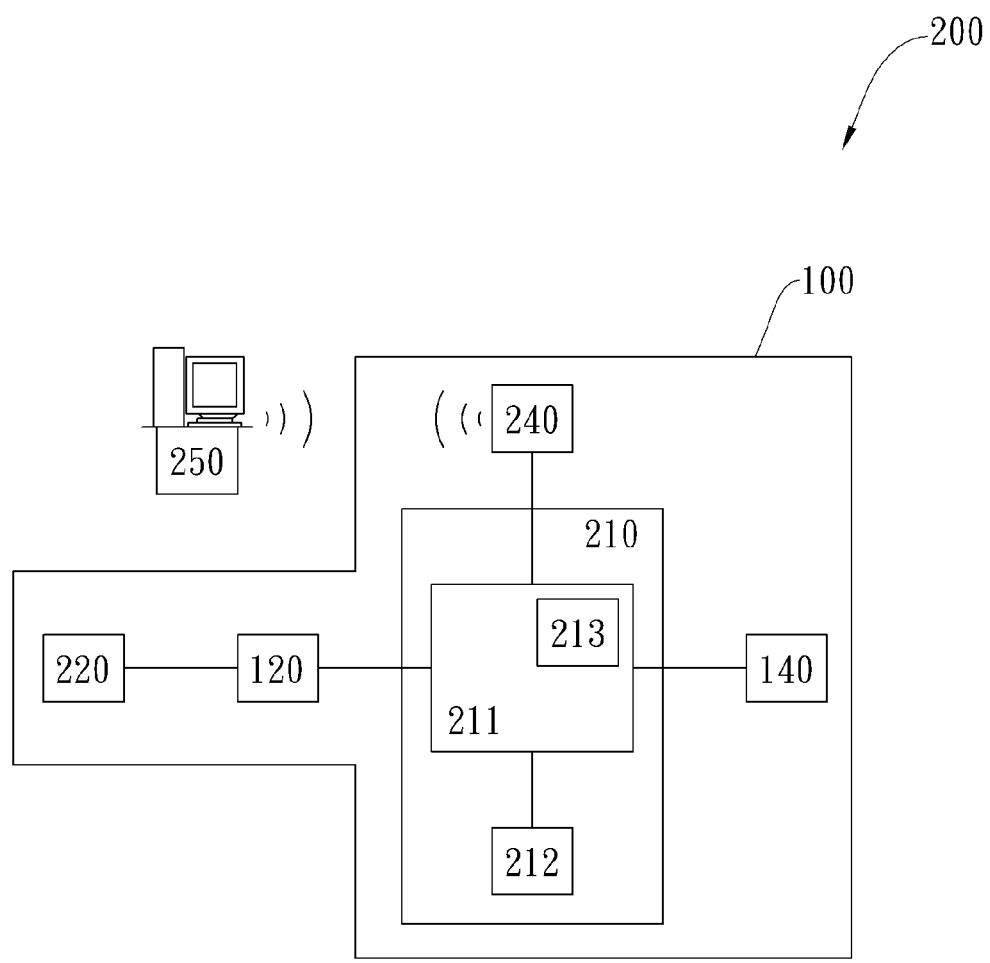
FIG. 2 is a schematic view of a system for mapping pipeline of the present invention.

FIG. 2 is a schematic view of a system 200 for mapping pipeline of the present invention. The system 200 for mapping pipeline is used for mapping a fluid pipeline. As shown in FIG. 2, the system 200 for mapping pipeline comprises an apparatus 100 for mapping pipeline comprising a pressure gauge 120, a gyroscope 140, a processing module 210 and a data output module 240. As described above, the pressure gauge 120 measures the pressure of the fluid in the fluid pipeline and the gyroscope 140 measures the angular velocity of the apparatus 100 for mapping pipeline in the fluid pipeline.

The processing module 210 collects and converts the pressure of the fluid and the angular velocity to a pressure data and an angular velocity data. The processing module 210 generally comprises an integrated circuit (IC) 211 and a battery 212. The IC 211 is disposed on the circuit board 130 (as shown in FIG. 1) and electrically connected to the pressure gauge 120 and the gyroscope 140. Moreover, the IC 211 converts the pressure of the fluid and the angular velocity to the pressure data and the angular velocity data. The battery 212 is disposed inside the hollow housing 110 (as shown in FIG. 1) and under the circuit board 130 to which it is electrically connected. The processing module 210 comprises a memory module 213 to store the pressure data and the angular velocity data. The memory module 213 may be a volatile memory or a non-volatile memory.

In one mode of the present invention, the circuit board 130 comprises an oscillator 220. The oscillator 220 generates and transmits a pulse signal to the pressure gauge 120. The pressure gauge 120 receives the pulse signal to measure the pressure of the fluid periodically.

The data output module 240 outputs the pressure data and the angular velocity data to a computer system 250. In one mode of the present invention, the data output module 240 is a wireless transmission module that periodically transmits the pressure data and the angular velocity data. Generally, the wireless transmission module is included in the circuit board 130.

As described above, the system 200 for mapping pipeline is configured to detect the flow of water drops in the pipeline and map the fluid pipeline concealed by panels. The apparatus 100 for mapping pipeline enters the pipeline and collects data from the pressure gauge 120 and the gyroscope 140.

Figure 3:
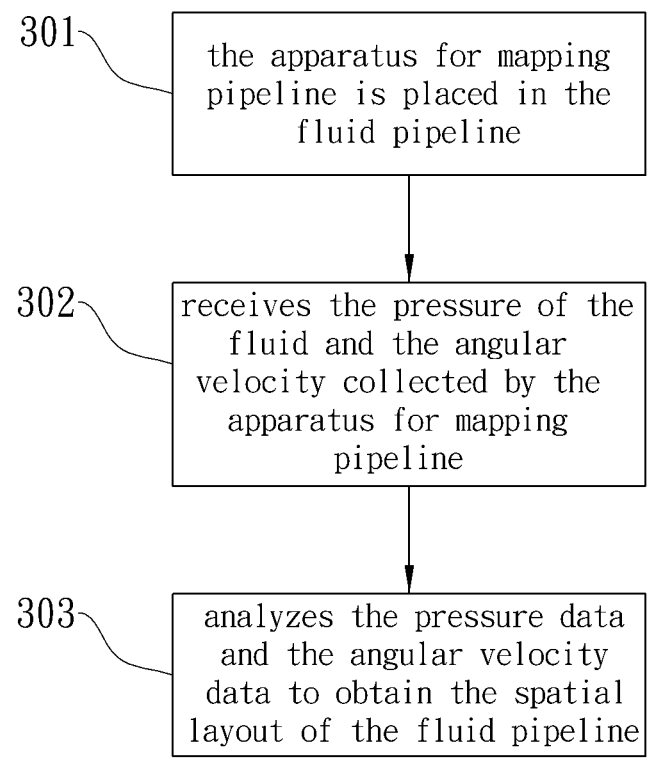
FIG. 3 illustrates a method for mapping pipeline that employs the system for mapping pipeline.

FIG. 3 illustrates a method for mapping pipeline that employs the system for mapping pipeline. As shown in Step 301, the apparatus 100 for mapping pipeline is placed in the fluid pipeline to collect the pressure of the fluid in the fluid pipeline and the angular velocity thereof during the period of time when it moves in the fluid pipeline. In Step 302, the computer system 250 receives the pressure of the fluid and the angular velocity collected by the apparatus 100 for mapping pipeline.

When the outlet of the fluid pipeline is opened, the force of the water flow will push the apparatus 100 for mapping pipeline to pass through different paths. Meanwhile, the apparatus 100 for mapping pipeline collects the pressure of the fluid in the fluid pipeline and the angular velocity thereof and transmits the pressure data and the angular velocity data to the computer system 250 through a wireless transmission device. Alternatively, the apparatus 100 for mapping pipeline stores the pressure data and the angular velocity data in the memory module 213. After leaving the fluid pipeline, the apparatus 100 for mapping pipeline is connected to the computer system 250. The computer system 250 comprises an acquisition interface to receive the stored pressure data and angular velocity data.

If the fluid pipeline has branches, the apparatus 100 for mapping pipeline will not flow along a single path. To solve the aforementioned problem, the apparatus 100 for mapping pipeline can be repeatedly placed in the fluid pipeline to obtain data about different paths along which it flows. Moreover, the collection of data along the same path for several times makes the collected data more accurate.

Figure 4:
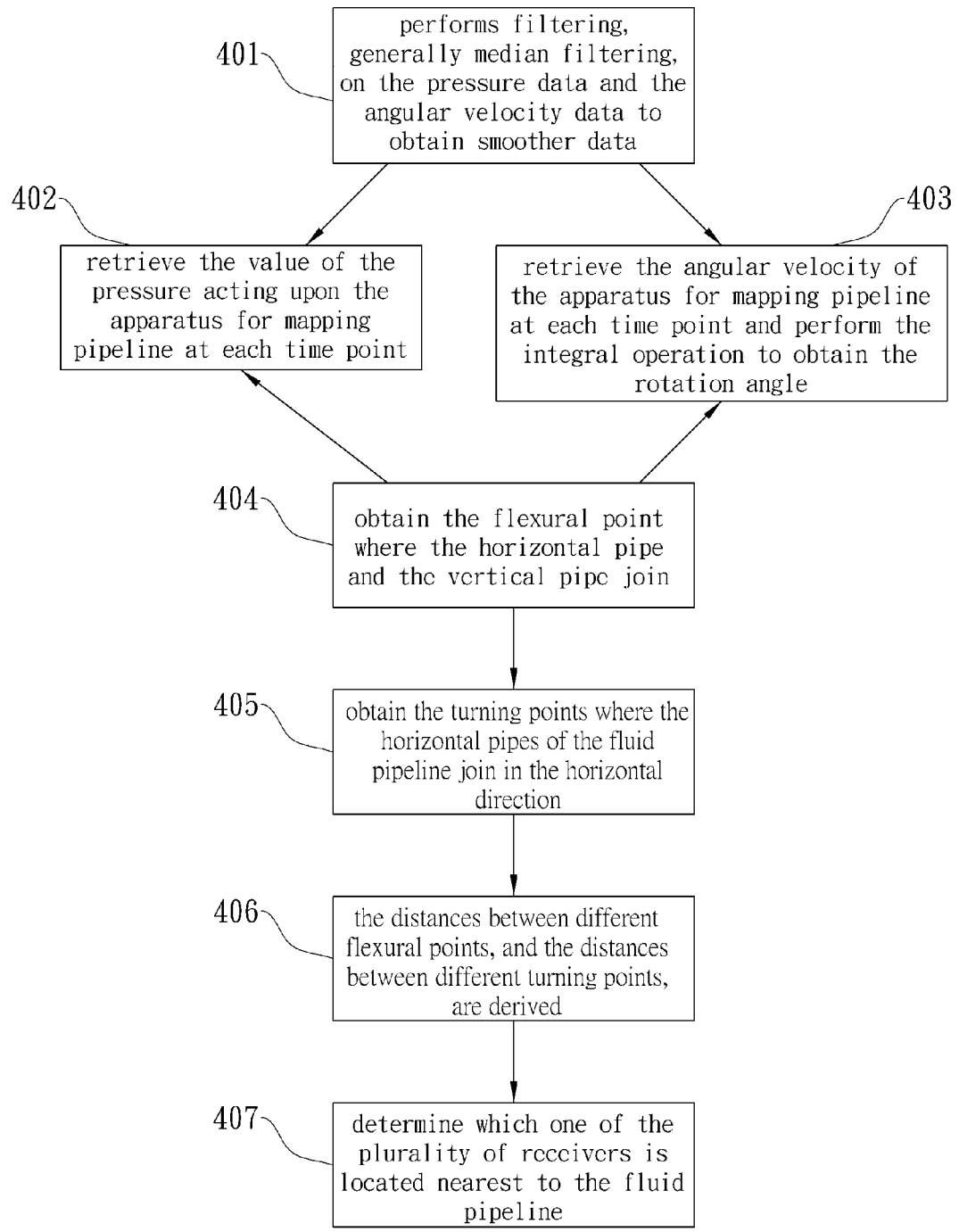
FIG. 4 illustrates the steps performed for obtaining the spatial layout of the fluid pipeline.

In Step 303, the computer system 250 analyzes the pressure data and the angular velocity data to obtain the spatial layout of the fluid pipeline. FIG. 4 illustrates the steps performed for obtaining the spatial layout of the fluid pipeline. In Step 401, the computer system 250 performs filtering, generally median filtering, on the pressure data and the angular velocity data to obtain smoother data. Median filtering is a technique commonly employed in processing images and can be used to filter out noises from the pressure data and the angular velocity data of the present invention. For example, the medians of the pressure data calculated in respective time intervals are connected to form a smooth linear curve.

In Step 402, the computer system 250 analyzes the smooth pressure data to retrieve the value of the pressure acting upon the apparatus 100 for mapping pipeline at each time point.

In Step 403, the computer system 250 analyzes the smooth angular velocity data to retrieve the angular velocity of the apparatus 100 for mapping pipeline at each time point. The integral operation can be performed on the angular velocity of the apparatus 100 for mapping pipeline to obtain the rotation angle.

Figure 5:
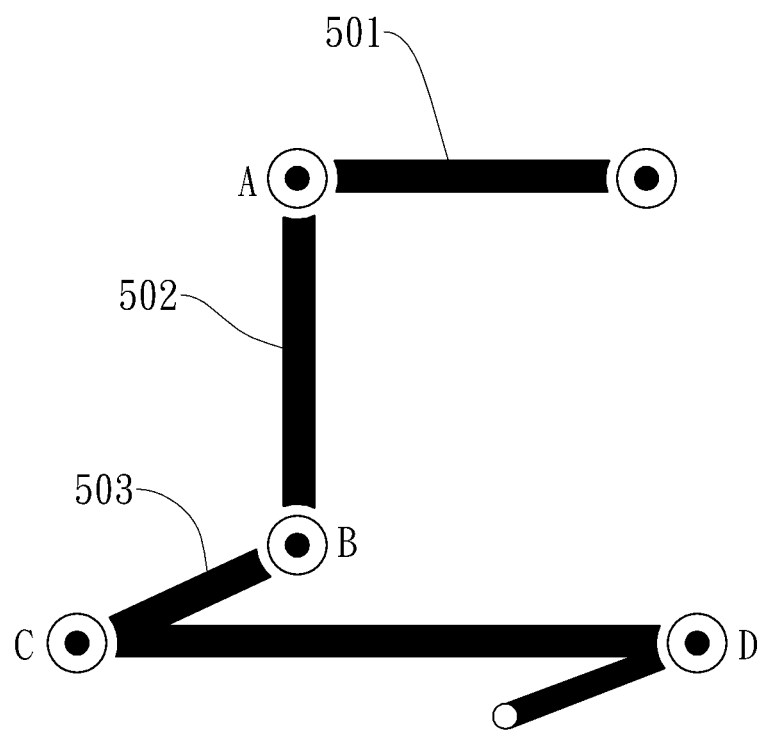
FIG. 5 is a schematic view showing the structure of a pipeline to be tested.
Figure 6:
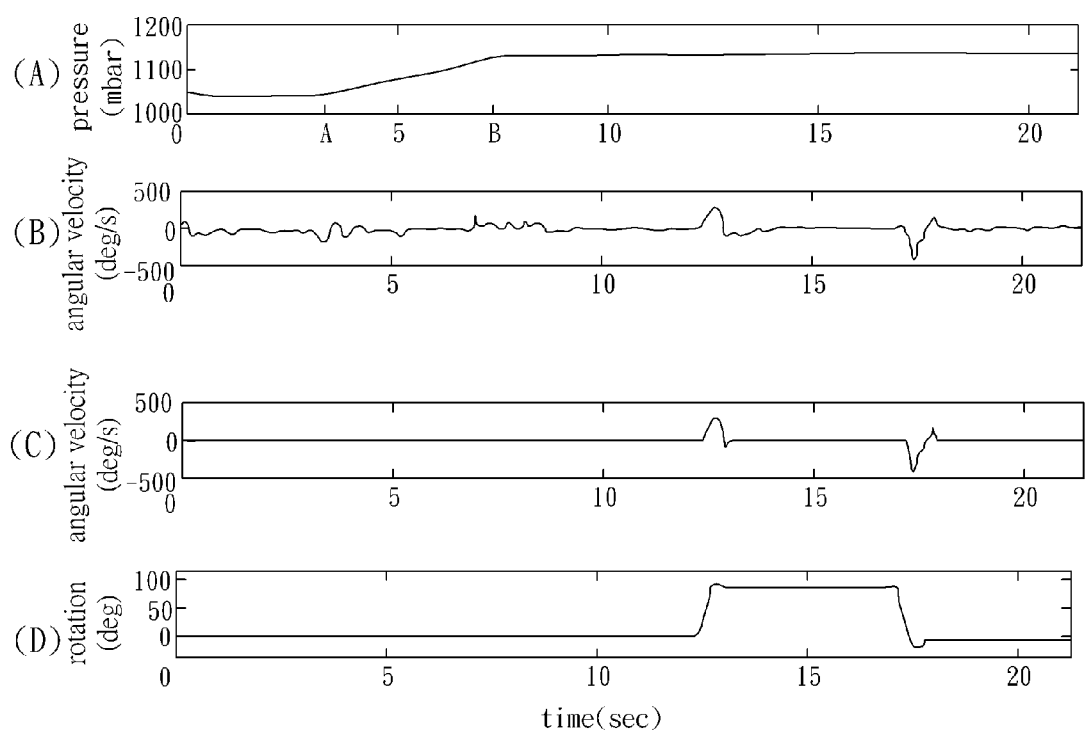
FIG. 6A is a graph illustrating the values of the pressure acting upon the apparatus for mapping pipeline during the period of time when the apparatus for mapping pipeline moves in the pipeline to be tested.
FIG. 6B is a graph illustrating the angular velocity of the apparatus for mapping pipeline measured during the period of time when the apparatus for mapping pipeline moves in the pipeline to be tested.
FIG. 6C is a graph illustrating the smooth angular velocity data obtained after filtering has been performed.
FIG. 6D is a graph illustrating the rotation angles of the apparatus for mapping pipeline measured during the period of time when the apparatus for mapping pipeline moves in the pipeline to be tested.

In Step 404, the computer system 250 analyzes the value of the pressure acting upon the apparatus 100 for mapping pipeline at each time point to obtain the flexural point where the horizontal pipe and the vertical pipe join. FIG. 6 shows the values of the pressure acting upon the apparatus 100 for mapping pipeline in the pipeline 500 to be tested (as shown in FIG. 5). The value of the pressure acting upon the apparatus 100 for mapping pipeline moving in the horizontal pipe 501 should be a constant. When the apparatus 100 for mapping pipeline enters the vertical pipe 502, the value of the pressure acting thereupon will vary due to the change in height. As shown in FIG. 6A, when the apparatus 100 for mapping pipeline enters the downward vertical pipe 502 from the horizontal pipe 501, the value of the pressure acting upon the apparatus 100 for mapping pipeline moving in the horizontal pipe 501 should be a constant. After the apparatus 100 for mapping pipeline passes through the flexural point A, the value of the pressure acting upon the apparatus 100 for mapping pipeline moving in the downward vertical pipe 502 should be a steadily increasing value. Conversely, when the apparatus 100 for mapping pipeline enters the horizontal pipe 503 from the downward vertical pipeline 502, the value of the pressure acting upon the apparatus 100 for mapping pipeline moving in the horizontal pipe 503 should be a constant. Therefore, the value of the pressure acting upon the apparatus 100 for mapping pipeline moving in the horizontal pipe 503 should be a constant after the apparatus 100 for mapping pipeline passes through the flexural point B.

In Step 405, the computer system 250 analyzes the rotation angle of the apparatus 100 for mapping pipeline at each time point to obtain the turning points where the horizontal pipes of the fluid pipeline join in the horizontal direction. Generally, the integral operation can be performed on the smooth angular velocity data to obtain the rotation angle of the apparatus 100 for mapping pipeline at each time point. Please refer to FIGS. 5 and 6. FIG. 6B is a graph illustrating the angular velocity of the apparatus 100 for mapping pipeline during the period of time when the apparatus 100 for mapping pipeline moves in the fluid pipeline. FIG. 6C is a graph illustrating the smooth angular velocity data obtained through filtering performed by the computer system 250 in Step 401. FIG. 6D is a graph illustrating the rotation angles obtained in Step 406. As shown in FIG. 6D, when the apparatus 100 for mapping pipeline moves straight forward in the pipeline, the rotation angle of the apparatus 100 for mapping pipeline should be a constant. When the apparatus 100 for mapping pipeline passes through the turning point C, the angular velocity of the apparatus 100 for mapping pipeline increases immediately, and this means the turning point C is a left turning point. Conversely, if the angular velocity of the apparatus 100 for mapping pipeline decreases immediately when the apparatus 100 for mapping pipeline passes through the turning point D, this means the turning point D is a right turning point. As shown in FIG. 6D, the apparatus 100 for mapping pipeline has a rotation angle of 90 degrees when passing through the turning points C and D, respectively, corresponding to the structure of the fluid pipeline shown in FIG. 5.

In Step 406, the distances between different flexural points are derived from respective time points at which the velocity and pressure of the flow in the fluid pipeline change, and the distances between different turning points can be derived from respective time points at which the velocity of the fluid in the fluid pipeline and the rotation angle change. After respective time points at which the apparatus 100 for mapping pipeline passes through each flexural point and turning point have been obtained, the time difference between different flexural points is multiplied by the velocity of the fluid to get the distance between different flexural points, and the time difference between different turning points is multiplied by the velocity of the fluid to get the distance between different turning points. Accordingly, the spatial layout of the fluid pipeline is obtained.

Figure 7A:
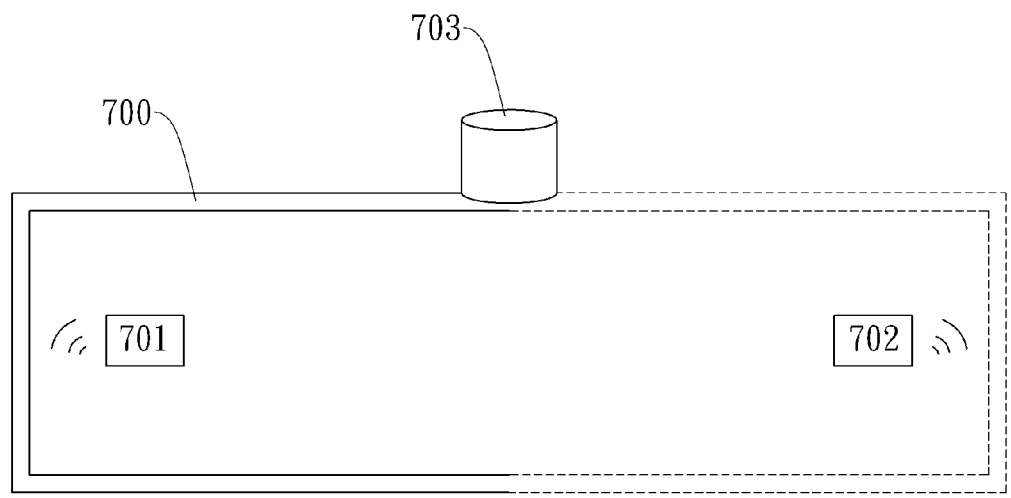
FIG. 7A is a schematic view showing the arrangement of a plurality of receivers.
Figure 7B:
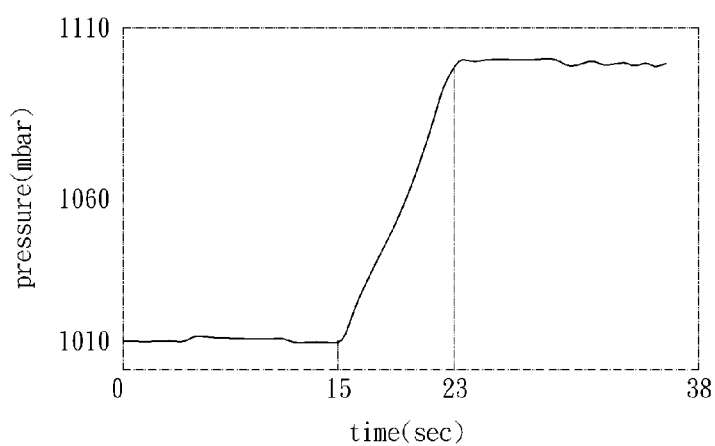
FIG. 7B is a graph illustrating the values of the pressure measured by the apparatus for mapping pipeline.

In one embodiment of present invention, the steps performed for obtaining the spatial layout of the fluid pipeline could further include Step 407. In Step 407, the reception rates of the plurality of receivers that receive signals from the apparatus 100 for mapping pipeline are compared to determine which one of the plurality of receivers is located nearest to the fluid pipeline. Referring to FIG. 7A, the system 200 for mapping pipeline comprises a plurality of receivers 701 and 702 that receive wireless signals transmitted by the apparatus 100 for mapping pipeline. The signals may be the pressure data and the angular velocity data. The apparatus 100 for mapping pipeline enters the fluid pipeline from the inlet 703 and obtains the pressure data and the angular velocity data. The analysis of the value of the pressure (as shown in FIG. 7B) acting upon the apparatus 100 for mapping pipeline indicates that the fluid pipeline 700 may be disposed at any plane in 360 degrees. The reception rates of the plurality of receivers 701 and 702 that receive signals from the apparatus 100 for mapping pipeline are compared to determine which one of the plurality of receivers 701 and 702 is located nearest to the fluid pipeline 700. In this step, the spatial layout of the fluid pipeline is obtained by detecting the successful reception rate of wireless signal packets and eliminating unreasonable structures according to the limits of the building. The fluid pipeline in the house is generally concealed by walls, thus only two receivers are required.

As the above description demonstrates, the present invention has novelty and inventive step and is susceptible of industrial application. While this invention has been described by way of examples and in terms of preferred embodiments, it is to be understood that this invention is not limited hereto. A person having ordinary skill in the art can make various changes and alterations herein without departing from the spirit and scope of this invention.

What is claimed is:
1. An apparatus for mapping pipeline, comprising:
a hollow housing having a through hole;
a pressure gauge disposed in the through hole to seal an interior of the hollow housing and configured to measure an external pressure of the hollow housing;
a circuit board disposed inside the hollow housing and electrically connected to the pressure gauge;

a gyroscope disposed inside the hollow housing and configured to measure an angular velocity of the apparatus for mapping pipeline, the gyroscope being electrically connected to the circuit board; and a weight disposed inside the hollow housing and located under the circuit board.

2. The apparatus for mapping pipeline according to claim 1 further comprising:

a rear fin disposed on an external surface of the hollow housing.

3. The apparatus for mapping pipeline according to claim 1, wherein the pressure gauge is disposed on the topmost of the apparatus for mapping pipeline.

4. The apparatus for mapping pipeline according claim 1, wherein the weight is disposed at the bottom of the hollow housing.

5. The apparatus for mapping pipeline according to claim 1, wherein the hollow housing is sphere-shaped and the weight is hemisphere-shaped.

6. The apparatus for mapping pipeline according to claim 1 further comprising:

an integrated circuit (IC) disposed on the circuit board and electrically connected to the pressure gauge and the gyroscope, the IC being configured to convert the external pressure and the angular velocity to a pressure data and an angular velocity data; and a battery disposed inside the hollow housing and under the circuit board to which it is electrically connected.

7. The apparatus for mapping pipeline according to claim 6, wherein the circuit board comprises a wireless transmission module that periodically transmits the pressure data and the angular velocity data.

8. The apparatus for mapping pipeline according to claim 6, wherein the integrated circuit comprises a memory module that stores the pressure data and the angular velocity data.

9. The apparatus for mapping pipeline according to claim 1, wherein the circuit board comprises an oscillator that generates and transmits a pulse signal to the pressure gauge.

10. A system for mapping pipeline for use in a fluid pipeline comprising:

an apparatus for mapping pipeline comprising a pressure gauge that measures a pressure of a fluid in the fluid pipeline; a gyroscope that measures an angular velocity of the apparatus for mapping pipeline in the fluid pipeline; a processing module that collects and converts the pressure of the fluid and the angular velocity to a pressure data and an angular velocity data; and a data output module that outputs the pressure data and the angular velocity data;

wherein the data output module outputs the pressure data and the angular velocity data to a computer system, and the computer system analyzes the pressure data and the angular velocity data to obtain a spatial layout of the fluid pipeline.

11. The system for mapping pipeline according to claim 10, wherein the computer system analyzes the pressure data to obtain a flexural point where a horizontal pipe and a vertical pipe join.

12. The system for mapping pipeline according to claim 10, wherein the computer system analyzes the angular velocity data to obtain a rotation angle of the apparatus for mapping pipeline during a period of time when the apparatus for mapping pipeline moves in the fluid pipeline, and the rotation angle is analyzed to obtain a turning point where the horizontal pipes of the fluid pipeline join in a horizontal direction.

13. The system for mapping pipeline according to claim 10, wherein the apparatus for mapping pipeline comprises a wireless transmission module that immediately transmits the pressure data and the angular velocity data to the computer system.

14. The system for mapping pipeline according to claim 13 further comprising a plurality of receivers that receive the pressure data and the angular velocity data transmitted by the apparatus for mapping pipeline.

15. The system for mapping pipeline according to claim 10, wherein the apparatus for mapping pipeline comprises a memory module that stores the pressure data and the angular velocity data, and the computer system comprises an acquisition interface to receive the stored pressure data and angular velocity data.

16. A method for mapping pipeline for use in a fluid pipeline comprising:

placing an apparatus for mapping pipeline in the fluid pipeline to collect a pressure of a fluid in the fluid pipeline and an angular velocity of the apparatus for mapping pipeline during a period of time when the apparatus for mapping pipeline moves in the fluid pipeline;

receiving the pressure of the fluid and the angular velocity collected by the apparatus for mapping pipeline; and analyzing the pressure of the fluid and the angular velocity to obtain a spatial layout of the fluid pipeline.

17. The method for mapping pipeline according to claim 16, wherein the step of analyzing further comprises analyzing the pressure of the fluid to obtain a flexural point where a horizontal pipe and a vertical pipe join.

18. The method for mapping pipeline according to claim 17 further comprising deriving a distance between different flexural points from respective time points at which a velocity of the fluid and the pressure of the fluid in the fluid pipeline change.

19. The method for mapping pipeline according to claim 16, wherein analyzing the pressure of the fluid and the angular velocity further comprises analyzing the angular velocity to obtain a rotation angle of the apparatus for mapping pipeline during the period of time when the apparatus for mapping pipeline moves in the fluid pipeline and analyzing the rotation angle to obtain a turning point where the horizontal pipes of the fluid pipeline join in a horizontal direction.

20. The method for mapping pipeline according to claim 19 further comprising deriving a distance between different turning points from respective time points at which the velocity of the fluid in the fluid pipeline and the rotation angle change.

21. The method for mapping pipeline according to claim 16 further comprising performing filtering on the pressure of the fluid and the angular velocity.

22. The method for mapping pipeline according to claim 16 further comprising:

installing a plurality of receivers that receive signals from the apparatus for mapping pipeline, wherein the reception rates of the plurality of receivers are compared to determine which one of the plurality of receivers is located nearest to the fluid pipeline.

* * * * *